PULSE INTEGRATING CIRCUIT WITH SERIALLY CONNECTED
FEED AND RESERVOIR CAPACITORS
Filed Jan. 24, 1958

INVENTOR
EDMUND HARRY COOKE-YARBOROUGH
BY Larson and Taylor
ATTORNEYS 3,021,485

PULSE INTEGRATING CIRCUIT WITH SERIALLY CONNECTED FEED AND RESERVOIR CAPACITORS

Edmund Harry Cooke-Yarborough, Longworth, England, assignor to The United Kingdom Atomic Energy Authority, London, England Filed Jan. 24, 1958, Ser. No. 711,050
Claims priority, application Great Britain Feb. 1, 1957
5 Claims. (Cl. 328—127)

This invention relates to integrating circuits for electrical pulses.

A circuit providing an indication of mean pulse rate is disclosed in the specification of British Patent 696,753. In this circuit the reservoir condenser and leakage resistor of a diode pump circuit are connected in parallel between the input and output of a feedback D.C. amplifier. By removing the leakage resistor the circuit can be made into a count integrator, the charge on the reservoir condenser and the voltage at the output of the amplifier being proportional to the total number of pulses of constant amplitude fed in through the diode pump circuit.

A disadvantage of this circuit in practice is that the charge leaks slowly away, owing to internal leakage in the reservoir condenser, grid current in the first valve of the amplifier and back-leakage in the diode feeding the condenser. If the condenser is of good quality and the first amplifier valve is an electrometer, the main limitation in performance is set by the diode leakage.

It is an object of the present invention to provide an integrating circuit of improved performance.

According to the present invention an integrating circuit for electrical pulses comprises a feed condenser and a reservoir condenser arranged to be charged in series through the control-grid/cathode path of the first valve of a D.C. amplifier during said pulses, said feed condenser being discharged after each said pulse and said reservoir condenser forming a negative feedback connection for said amplifier between said pulses, whereby said reservoir condenser receives a substantially constant charge increment during each said pulse and the output voltage of said amplifier is substantially the voltage across said reservoir condenser.

Also according to the present invention an integrating circuit for electrical pulses comprises a feed condenser, a reservoir condenser and a D.C. amplifier, one side of said reservoir condenser being connected to the control grid of the first valve of said amplifier and the other side through a resistive impedance to the output of said amplifier, and said feed condenser being connected between an input terminal and the side of said reservoir condenser remote from said input grid.

The said resistive impedance may be a unidirectional conducting device so connected as to conduct conventional current towards the junction of said condensers.

The circuit may be used as a counting ratemeter by shunting the reservoir condenser with a suitable resistor.

Figure 1:
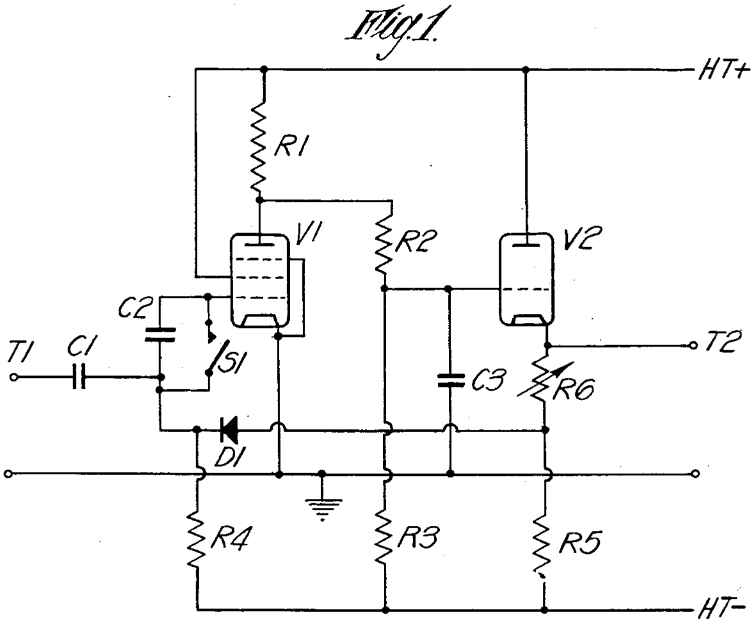
Figures 2, 3:
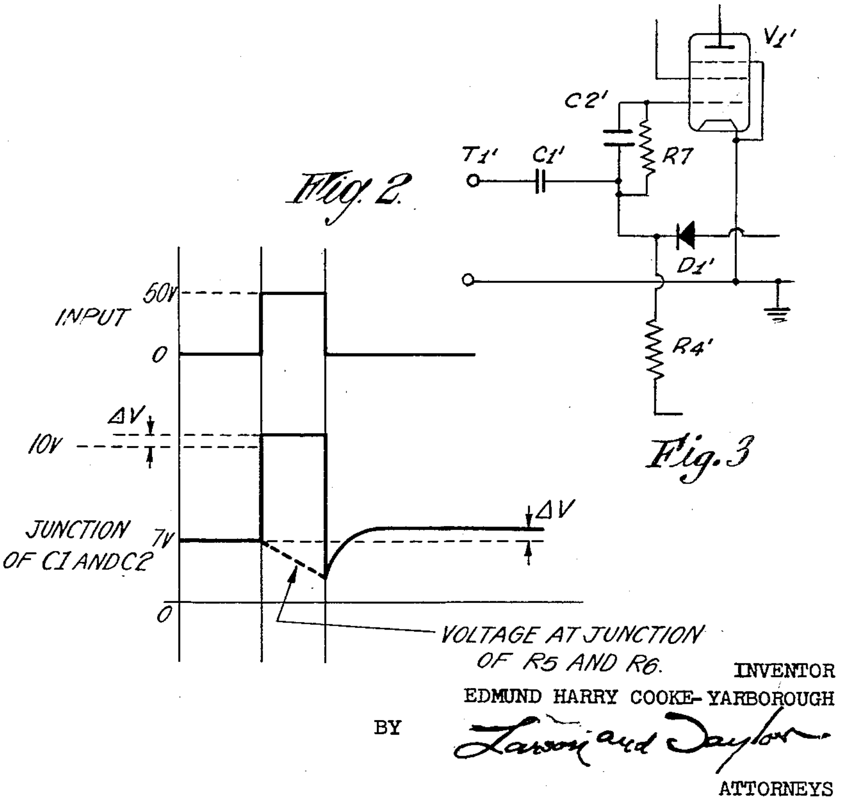

To enable the nature of the invention to be more readily understood, attention is directed towards the accompanying drawings, of which FIG. 1 shows, by way of example, a circuit diagram of an embodiment of the invention, FIG. 2 shows waveforms in the embodiment of FIG. 1 and FIG. 3 is a diagram of a modification of the circuit of FIG. 1.

In FIG. 1 valves V1 (preferably an electrometer valve) and V2 form a D.C. amplifier in a manner known in the art. One side of a reservoir condenser C2 is connected to the control grid of V1 and the other side through a semi-conductor diode D1 to the cathode of V2, from which the output voltage is obtained via a terminal T2. The condenser C2 and the diode D1 in series form a negative feedback connection between the input and output of the amplifier. (A small variable resistor R6 is included between the cathode of V2 and the feedback lead to D1 for setting zero.) A feed condenser C1 is connected between an input terminal T1 and the junction of C2 and D1, and a resistor R4 is connected between this junction and HT—. A condenser C3 is connected between the grid of V2 and earth.

The circuit described above is adapted to receive short, positive-going input pulses delivered from a low-impedance source and having a constant amplitude of 50 v. or more. When such a pulse is applied the diode D1 is cut off and the grid of V1 is driven positive until grid current flows, when C1 and C2 charge in series through the grid-cathode path of V1. C2 is made very large compared with C1, so the charge which flows in each condenser is very nearly $(V-v_g)$C1, where $v_g$ is the difference between the normal grid voltage of V1 and that at which grid current begins to flow. The charge-per-pulse is therefore substantially the same in the present circuit as in the circuit of the aforementioned patent specification. At the end of a pulse the grid of V1 is taken negative again and D1 conducts, restoring negative feedback to the circuit and discharging C1. To keep D1 conducting and the feedback operative in the absence of input pulses, a small current of the order of a few tens of microamps is passed through the diode via the resistor R4.

In FIG. 2 it is assumed that the pulses already received by the circuit have built up a voltage of 10 v. across the reservoir condenser C2 and that the grid of V1 is sitting at —3 v. On application of a 50 v. input pulse the voltage at the junction of C1 and C2 therefore rises from 7 v. to 10 v., at which point grid current starts to flow in V1, and C1 and C2 start to charge. The voltage at the junction now rises by a further incremental amount ΔV, the amount depending on the relative capacities of C1 and C2. As C1 is very much smaller than C2, ΔV is virtually equal to 47C1/C2. At the end of the pulse the voltage at the junction falls until it meets the voltage at the junction of R5 and R6, at which point D1 conducts and discharges C1, the voltage at both junctions being restored to a level of 7 v. + ΔV by the feedback action of the amplifier. It may be noted that despite the gradual rise of voltage at the junction with successive input pulses, the voltage change across C1 during the pulse remains constant (neglecting the finite gain of the amplifier) and so therefore does the charge per pulse and the incremental voltage acquired by C2.

The initial conditions are established and resetting performed by discharging the condenser C2 through a pair of contacts S1 connected across it.

During the pulse V1 is conducting hard, causing a negative pulse to appear at the output terminal T2 and at the anode of D1. This pulse is reduced to a slowly falling voltage by connecting the grid of V2 to earth via C3, the reduction being desirable for two reasons: firstly, if the pulse is large the mean voltage at the cathode of V2 will differ slightly from the voltage existing while the feedback is operative; and secondly, because a large negative pulse at the anode of D1, is communicated to C1 through the diode capacitance and back-leakage, will reduce the charge fed through C2 during the pulse. In general the pulse source must have an impedance low enough to enable it to supply a current large compared with the current flowing in R4 and with the reverse leakage of the diode, in which case these two effects can be neglected. If the source impedance is sufficiently low and the pulse duration short enough in relation to the mean pulse spacing, the diode D1 may be replaced by a resistor and R4 eliminated.

The effect of $v_g$ is increased if there is appreciable capacitance to earth from either side of C2. As C2 may be physically quite large, this stray capacitance $(C_s)$ may not be negligible. If it is comparable with C1, the charge-per-pulse becomes $$C1\left[V-v_g\left(1+\frac{Cs}{C1}\right)\right]$$

and is thus more dependent upon the value of $v_g$. Thus the value of C1 is preferably chosen to be large compared with the stray capacitance.

Apart from its use as a count integrator, the circuit can be used in a counting ratemeter by shunting C2 with a suitable leak resistor, R7, as shown in FIG. 3. As a ratemeter circuit it has the advantage of being slightly simpler than the circuit of the aforementioned patent specification, and the disadvantage that the feed condenser has to be made rather larger owing to the greater stray capacitance.

I claim:

1. An integrating circuit for electrical pulses comprising a feed condenser, a reservoir condenser and a phase-reversing direct-current amplifier having a first valve, one side of said reservoir condenser being connected to the control grid of said first valve and said feed condenser being connected between the other side of said reservoir condenser and an input terminal whereby an input pulse may cause said condensers to charge in series through the control-grid/cathode path of said valve, and a resistive impedance connected between said other side of said reservoir condenser and an output of said amplifier, the arrangement being such that said reservoir condenser receives a substantially constant charge increment during each pulse and said feed condenser is discharged after each pulse, an output voltage being obtainable from said amplifier which is substantially the voltage across said reservoir condenser.

2. An integrating circuit as claimed in claim 1 wherein said resistive impedance is a unidirectional conducting device so connected as to conduct conventional current towards the junction of said condensers.

3. An integrating circuit as claimed in claim 1 comprising contact means for discharging said reservoir condenser.

4. A ratemeter circuit comprising an integrating circuit as claimed in claim 1 wherein said reservoir condenser is shunted by a resistor.

5. An integrating circuit for electrical pulses comprising a feed condenser, a reservoir condenser and a phase-reversing direct-current amplifier having a first electronic switching device, said device having a current input electrode, a control electrode and a current output electrode, one side of said reservoir condenser being connected to said control electrode and said feed condenser being connected between the other side of said reservoir condenser and an input terminal whereby an input pulse may cause said condensers to charge in series through the control-electrode/current-input-electrode path of the device, and a feedback connection between said other side of said reservoir condenser and an output of said amplifier, the arrangement being such that said reservoir condenser receives a substantially constant charge increment during each pulse and said feed condenser is discharged after each pulse, an output voltage being obtainable from said amplifier which is substantially the voltage across said reservoir condenser.

References Cited in the file of this patent

UNITED STATES PATENTS

| | | |
|---|---|---|
| 1,939,398 | Koch | Dec. 12, 1933 |
| 2,436,891 | Higinbotham | Mar. 2, 1948 |
| 2,505,549 | Jones | Apr. 25, 1950 |
| 2,541,824 | Lord | Feb. 13, 1951 |
| 2,562,792 | James | July 31, 1951 |
| 2,621,292 | White | Dec. 9, 1952 |

FOREIGN PATENTS

| | | |
|---|---|---|
| 566,200 | Great Britain | Dec. 19, 1944 |